US008891513B1

(12) United States Patent
Huang et al.

(10) Patent No.: US 8,891,513 B1
(45) Date of Patent: Nov. 18, 2014

(54) SYSTEM AND METHOD FOR LOW LATENCY MULTICAST IN A NETWORK ENVIRONMENT

(75) Inventors: Wei-Jen Huang, Burlingame, CA (US); Chih-Tsung Huang, Burlingame, CA (US); Jerry Vogler, Buffalo Grove, IL (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 13/593,247

(22) Filed: Aug. 23, 2012

(51) Int. Cl.
*H04L 12/56* (2006.01)
*H04L 12/715* (2013.01)
*H04L 12/707* (2013.01)
*H04L 12/937* (2013.01)

(52) U.S. Cl.
CPC ............... *H04L 45/64* (2013.01); *H04L 49/253* (2013.01); *H04L 45/22* (2013.01)
USPC .......................................... 370/352; 370/389

(58) Field of Classification Search
CPC ..... H04L 41/0668; H04L 45/02; H04L 45/16; H04L 45/22; H04L 45/64; H04L 49/253
USPC ........................... 370/216, 390, 400, 352, 389
See application file for complete search history.

(56) References Cited

U.S. PATENT DOCUMENTS

| | | | |
|---|---|---|---|
| 2010/0074147 A1* | 3/2010 | Decasper et al. | 370/254 |
| 2010/0085892 A1* | 4/2010 | Kouhi | 370/254 |
| 2011/0205949 A1* | 8/2011 | Maenpaa et al. | 370/311 |
| 2013/0010648 A1* | 1/2013 | Tang et al. | 370/256 |
| 2013/0329605 A1* | 12/2013 | Nakil et al. | 370/255 |

OTHER PUBLICATIONS

Cisco Systems, Inc., "Market Data Network Architecture (MDNA) Overview," Technical Specification, © 2008, 38 pages.
Cisco Systems, Inc., "Trading Floor Architecture," Technical Specification, © 2007, 38 pages.

\* cited by examiner

*Primary Examiner* — Min Jung
(74) *Attorney, Agent, or Firm* — Patent Capital Group

(57) ABSTRACT

An example method is provided and includes generating a packet at a switch; and sending the packet from a designated source port to a plurality of egress ports over an overlay network that is to provide an alternate routing path having a lower latency characteristic compared to a standard routing path provided by a forwarding engine of the switch. In more particular embodiments, the overlay network includes one or more dedicated paths from the designated source port to the plurality of egress ports, and the one or more dedicated paths is determined from a mapping between the designated source port and the plurality of egress ports. In other instances, the mapping is provided in a routing table.

20 Claims, 4 Drawing Sheets

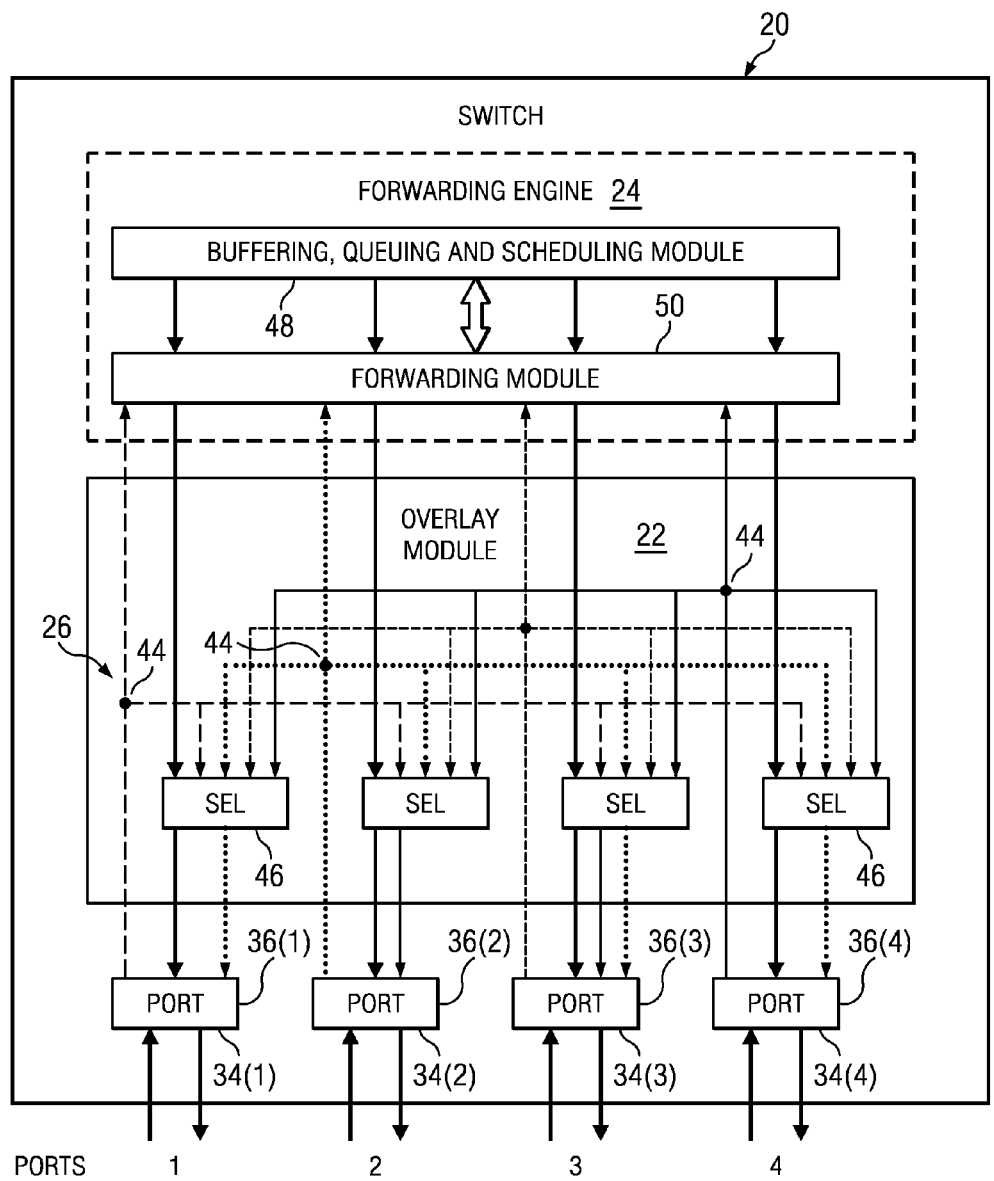

SYSTEM AND METHOD FOR LOW LATENCY MULTICAST IN A NETWORK ENVIRONMENT

TECHNICAL FIELD

This disclosure relates in general to the field of communications and, more particularly, to a system and a method for low latency multicast in a network environment.

BACKGROUND

Certain industries have demanding Information Technology (IT) requirements. For example, some financial services are experiencing an architectural shift towards Services-Oriented Architecture (SOA), Web services, and virtualization of IT resources. SOA takes advantage of the increase in network speed to enable dynamic binding and virtualization of software components, allowing new applications to be created without losing investment in existing systems and infrastructure. Another trend in the financial services industry is consolidation of servers into data center server farms, with ultra-thin clients at trader desks. High-speed Metro Area Networks (MANs) enable SOA and server farms with market data that can be multicast between different locations. This can lead to a virtualization of the trading floor. Typically, information flow in such a financial trading environment can be latency sensitive and, further, it can require high availability and high throughput performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified diagram illustrating further example details of an embodiment of the communication system;

FIG. 4 is a simplified block diagram illustrating further example details of an embodiment of the communication system;

DETAILED DESCRIPTION OF EXAMPLE EMBODIMENTS

Overview

An example method includes generating a packet at a switch and sending the packet from a designated source port to a plurality of egress ports over an overlay network that is to provide an alternate routing path having a lower latency characteristic compared to a standard routing path provided by a forwarding engine of the switch. Note that the term 'generating' encompasses any type of receiving, creating, formatting, packetizing, or otherwise forming a given packet. Additionally, the term 'sending' includes any activity associated with transmitting any portion of a data segment from one destination to another. The term 'lower latency characteristic' refers to any indicator, parameter, feature, descriptor, or measure that reflects some type of latency (in one or more directions). In more particular embodiments, the overlay network includes one or more dedicated paths from the designated source port to the plurality of egress ports, and the one or more dedicated paths is determined from a mapping between the designated source port and the plurality of egress ports. In other instances, the mapping is provided in a routing table.

The designated source port can be one of a plurality of eligible source ports, and the plurality of egress ports subscribe to the designated source port according to at least one subscription policy. The forwarding engine of the switch can provide a bridging function; a routing function; a redirecting function; a traffic policing and shaping function; an access control function; a queuing/buffering function; or a network address translation function, all of which may be based on particular needs.

A duplicate packet processed by the forwarding engine (e.g., included in the switch) and received at an egress port is preferentially dropped over another packet received at the egress port over the overlay network. The packet can be filtered at the designated source port or at least one of the plurality of egress ports. In other cases, the method can include modifying the packet after it is filtered. At least one of the plurality of egress ports can reduce an Inter-Data/Inter-Packet Gap, and another one of the plurality of egress ports can implement elastic buffers. Additionally, at least one of the plurality of egress ports can be elected to advertise capabilities to the designated source port.

Example Embodiments

Figure 1:
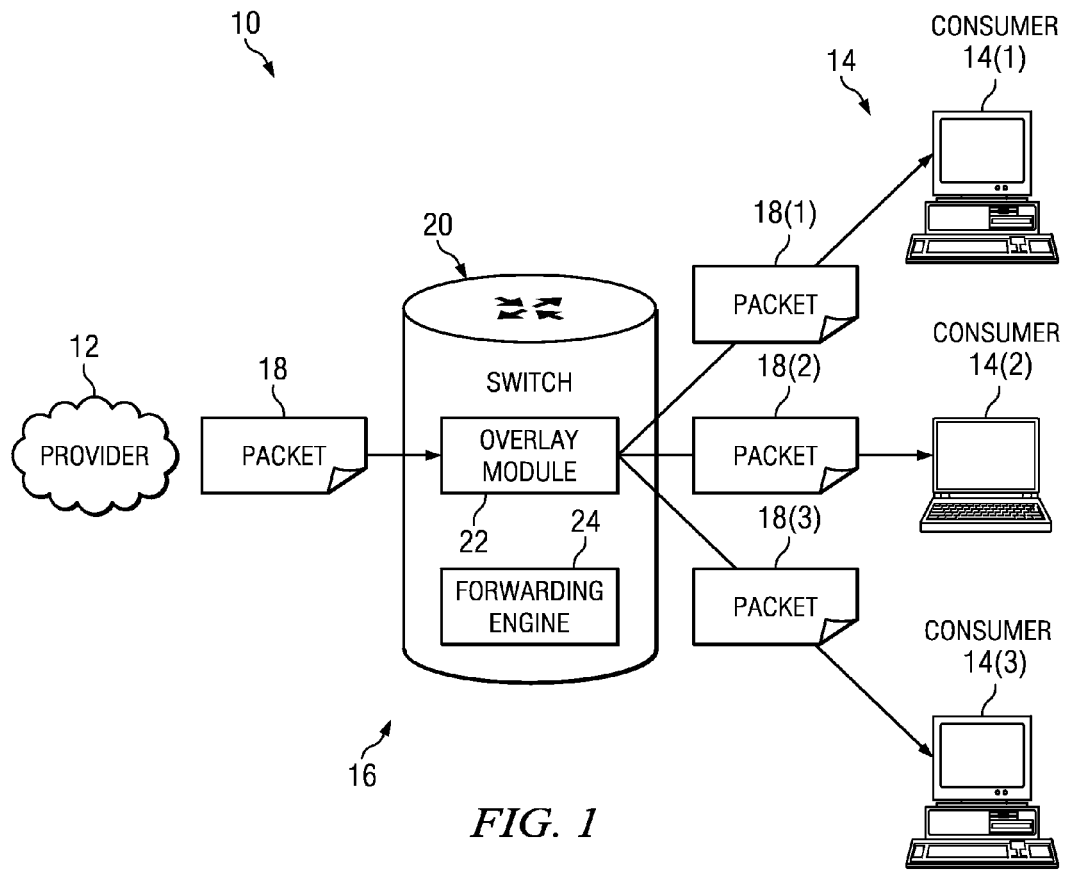
FIG. 1 is a simplified block diagram illustrating a communication system for low latency multicast in a network environment in accordance with one embodiment of the present disclosure.

Turning to FIG. 1, FIG. 1 is a simplified block diagram illustrating a communication system 10 for low latency multicast in a network environment in accordance with one example embodiment. Communication system 10 includes a provider 12 communicating with one or more consumers 14 (e.g., consumers 14(1), 14(2), 14(3)) over a network 16 (generally indicated by an arrow). As used herein, "provider" includes any person, entity, device, or application that can provide data to consumers 14.

Data, as used herein in this Specification, refers to any type of numeric, voice, video, or script data, or any type of source or object code, or any other suitable information in any appropriate format that may be communicated from one point to another in electronic devices and/or networks. For example, data can include market feeds in a financial trading environment. In another example, data can include news feeds from a news providing agency (e.g., Reuters®). As used herein, "consumer" includes any person, entity, device, or application that consumes (e.g., receives or uses) the data provided by provider 12. Examples of consumers can include traders, software applications, financial service providers, video stream providers, and newspapers.

In various embodiments, provider 12 may send a packet 18 that may be received at a switch 20. As used herein, the term "packet" is inclusive of any formatted unit of data communicated over network 16. Packet 18 may also include bytes, characters, or bits alone. Switch 20 may include an overlay module 22, which can facilitate multicasting identical or modified copies of packet 18 (packets 18(1), 18(2), and 18(3)) to consumers 14 with low latency and low jitter.

As used herein, "latency" can include a time interval between when data (e.g., packet 18) is sent from a source (e.g., provider 12) and when the same data (or same data modified suitably (e.g., packet 18 modified with Internet Protocol (IP) Time to Live (TTL) field decremented and relevant checksums updated)) is acknowledged by the receiving party (e.g., consumer 14(1)). Latency can reflect a measure of time delay in communication system 10. Latency can include one-way latency (e.g., time delay from provider 12 sending packet 18 to consumer 14(1) receiving packet 18), and two-way latency (e.g., time delay from provider 12 sending packet 18 to consumer 14(1) receiving it, plus time delay from consumer 14(1) sending an acknowledgement back to provider 12 and provider 12 receiving the acknowledgement). The term "jitter" (or packet delay variation) can include a measure of the variability over time of the latency across the network.

Overlay module 22 can combine full switching and routing capabilities with fast, guaranteed, low-jitter delivery of multicast traffic through hardware that is capable of flexible traffic filtering over dedicated and guaranteed fast paths from one or more designated source ports to one or more programmable sets of multicast egress ports. As used herein, the term "designated source port" can include eligible source ports of switch 20 that are designated (e.g., by a network administrator, suitable management applications, interested egress ports, etc.) to receive network traffic of a specific kind, or from a specific source. Designated source ports can also include any eligible source port in switch 20, from which certain egress ports are interested in receiving network traffic. In a general sense, one or more eligible ingress ports in switch 20 may be designated to be designated source ports. Each designated source port may have its own set of subscribed egress port(s).

As used herein, the term "eligible source port" can include a source port (e.g., a port that receives network traffic, also called ingress port) that has one or more dedicated paths facilitated by overlay module 22 to one or more egress ports. In some embodiments, not all source ports of switch 20 may be connected to overlay module 22. For example, some source ports may not be configured with appropriate hardware to enable overlay module 22 on those source ports. Such ports that are not connected to overlay module 22 may not be eligible source ports. In other embodiments, substantially all source ports of switch 20 may be connected to overlay module 22, and may be eligible source ports.

Substantially all designated source ports are eligible source ports; however, the reverse is not necessarily true, where not all eligible source ports can be designated source ports. When one or more egress ports subscribe to an eligible source port, the eligible source port becomes the designated source port for the subscribed egress ports. Moreover, a particular eligible source port may have compatible hardware enabling potential dedicated paths to a plurality of egress ports, and a subset of the plurality of egress ports may have a subscription policy with the eligible source port, making it the designated source port for the specific subset of subscribed egress ports (and not for the other non-subscribed egress ports).

According to various embodiments, switch 20 may also include a forwarding engine 24 that performs normal routing functions (e.g., bridging, routing, redirecting, traffic policing and shaping, access control, queuing/buffering, network address translation, and other functions of a Layer 2 and/or Layer 3 capable switch). In some embodiments, traffic arriving at switch 20 may be forwarded by both overlay module 22 and forwarding engine 24, according to particular switch configurations. In other embodiments, traffic arriving at switch 20 may be forwarded only by overlay module 22. In yet other embodiments, traffic arriving at switch 20 may be forwarded only by forwarding engine 24.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A trading environment can demand a low latency, high availability, and high throughput network environment. There can be two types of traffic specific to a trading environment: (1) market data and (2) trading orders. Market data typically carries pricing information for financial instruments, news, and other value-added information such as analytics. Market data is generally unidirectional and latency sensitive, typically delivered over User Datagram Protocol (UDP) multicast.

Market data typically flows from one or multiple external feeds, coming from market data providers like stock exchanges, data aggregators, and Electronic Communication Networks (ECNs). Market data may be received by feed handlers, which normalize and clean the data and then send it to consumers, such as pricing engines, algorithmic trading applications, human traders, etc. Sell-side firms may also send the market data to their clients (e.g., buy-side firms such as mutual funds, hedge funds, and other asset managers).

Trading orders can carry actual trades. Trading orders are typically bi-directional and latency sensitive. Typical trading orders may be communicated using Transmission Control Protocol/Internet Protocol (TCP/IP) and related bi-directional protocols. Trading orders can originate from a buy side or sell side firm and are generally sent to trading venues like an Exchange or ECN for execution.

Messaging applications may carry market data from providers to consumers. The message distribution can include "topic streams," which are subsets of market data defined by criteria such as ticker symbol, industry, or a certain basket of financial instruments. Certain consumers can subscribe to join topic streams mapped to one or more multiple sub-topics so as to receive only relevant information. For example, a sell-side firm specializing in small-cap companies may opt to receive market feeds relevant to the small-cap market.

High frequency and ultra-low latency trading environments can require fast distribution with low latency of packets to algorithmic trading engines and other consumers. Various components can introduce latency in the trading environment at each layer of the Open Systems Interconnection (OSI) stack. For example, in the applications layer, application hardware and software, program trading, ticker capture, etc. can cause latency. In the network layer, security, TCP/IP overhead and multicast replication can cause latency. In the interface layer, buffering, serialization, fragmentation, etc.

can cause latency. Maintaining an accurate measure of the dynamic state of latency across alternative routes and destinations can be of great assistance in tactical trading decisions for consumers in the trading environment (and other environments that demand low latency).

The ability to identify the exact location of delays can potentially determine the ability of service providers to meet their trading service-level agreements (SLAB). For buy-side firms, sell-side forms, and market-data syndicators, quick identification and removal of bottlenecks can translate directly into enhanced trade opportunities and revenue. Next-generation trading platforms, especially those supporting algorithmic trading, can demand latencies less than 5 ms and extremely low levels of packet loss. On a Gigabit local area network (LAN), for example, a 100 ms microburst can cause 10,000 transactions to be lost or excessively delayed. Although various solutions exist to tackle latency at each layer of the OSI stack, reducing latency at the network level can provide a more cost-effective and comprehensive solution than others.

For example, market data delivery may demand delivery of the same data stream to hundreds and potentially thousands of consumers. Market data services have been implemented with TCP or UDP broadcast as the network layer, but those implementations have limited scalability. Using TCP requires a separate socket and sliding window on the server for each recipient. UDP broadcast requires a separate copy of the stream for each destination subnet.

Both of these methods can exhaust the resources of the servers and the network. For example, the server side may have to transmit and service each of the streams individually, requiring increasingly large server farms. On the network side, the required bandwidth for the application increases in a linear fashion. For example, to send a 1 Mbps stream to 1000 recipients using TCP can require 1 Gbps of bandwidth. On the other hand, to deliver a 1 Mbps stream to 1000 recipients, IP multicast would require 1 Mbps.

Turning to the market data delivery, there can be two main phases of market data delivery to the consumer. In the first phase, the data stream may be brought from the exchange into the brokerage's network. The delivery of market data from the exchange to the brokerage is mostly a one-to-many communication. The second phase can involve injecting the data stream into the application messaging bus, which feeds a core infrastructure of the trading applications. The second phase includes many-to-many communication. Thousands of applications may use the market data streams for various purposes, such as live trades, long term trending, arbitrage, etc. The applications may even interact with the exchanges to place orders. Many of these applications may listen to the feeds and then republish their own analytical and derivative information. The delivery of these data streams is typically over a reliable multicast transport protocol, such as IP multicast.

IP multicast may be implemented in dense mode or sparse mode (or a combination thereof). In dense mode, a router assumes that all other routers want to forward multicast packets for a group. If a router receives a multicast packet and has no directly connected members present, a prune message is sent back to the source. Subsequent multicast packets are not flooded to this router on this pruned branch. In sparse mode, the router assumes that other routers do not want to forward multicast packets for the group, unless there is an explicit request for the traffic. When hosts join the multicast group, the directly connected routers send join messages toward a rendezvous point (RP) router. The RP keeps track of multicast groups. Hosts that send multicast packets are registered with the RP by a first hop router of that host. The RP then sends join messages toward the source. At this point, packets are forwarded on a shared distribution tree.

An interface on a router can be configured to be in dense mode, sparse mode, or sparse-dense mode. The mode determines how the router populates its multicast routing table and how the router forwards multicast packets it receives from its directly connected LANs. In populating the multicast routing table, dense mode interfaces are always added to the table. Sparse mode interfaces are added to the table when periodic join messages are received from downstream routers, or when a directly connected member is on the interface. When forwarding from a LAN, sparse mode operation occurs if an RP is known for the group. If so, the packets are encapsulated and sent toward the RP. When no RP is known, the packet is flooded in a dense mode fashion.

A forwarding engine (e.g., forwarding engine 24) in the routers may maintain a state (called route entry) to represent a distribution tree of the multicast group. As used herein, the term "forwarding engine" is inclusive of network elements that can provide various switching functions, including Layer 2 and Layer 3 packet switching, forwarding, route lookup, buffering, queuing, L3 QoS functions. The forwarding engine is typically implemented in one or more Application Specific Integrated Circuits (ASICs).

The forwarding engine can include several components, such as: Layer 2/Layer 3 packet processing ASIC, which performs Layer 2 and Layer 3 encapsulation and decapsulation, and manages the division and reassembly of packets within the switch; queuing and memory Interface ASICs, which manage buffering of data cells in memory and the queuing of notifications; routing processor, which provides the route lookup function; switch interface ASICs, which extract the route lookup key and manage the flow of data cells across the switch fabric; media-specific ASICs, which perform control functions tailored to the various media types. The forwarding engine may prepare packets for transmission across the switching fabric to the destination egress ports.

The route entry maintained by the forwarding engine may include such fields as: source address, group address, incoming interface from which packets are accepted, list of outgoing interfaces to which packets are sent, timers, flag bits, etc. Outgoing interfaces may point to the neighboring downstream routers that have sent Join/Prune messages toward the RP as well as the directly connected hosts, which have requested membership to the multicast group. Thus, to route an incoming packet to the multicast group, the forwarding engine in the router may have to perform packet inspection, look at various data (e.g., source IP address, destination IP address, etc.) in the packet header to determine if the packet is destined to a multicast group, determine outgoing interfaces from the route entry, and route the packet accordingly. Such processing can introduce latency into the system.

Moreover, the router (or group of routers in the multicast group) may implement various packet forwarding algorithms for constructing multicast packet delivery trees and performing multicast packet forwarding. Such algorithms may include, for example, flooding, spanning trees, reverse path forwarding, and reverse path multicasting. The router may maintain a topological database for a part (or whole) of the entire routing domain in executing most of the algorithms. Such routing mechanisms may also introduce latency during packet forwarding that may be unacceptable in low latency network environments, such as the financial trading environment.

Generally, normal switch latency can be less than 5 μsec per hop. Many 10 Gigabit Ethernet switches can operate in cut-through mode (rather than store-and-forward), where the nominal latency is the same regardless of the packet size. However, additional latency can be introduced in the switch due to queuing. Packets are generally queued due to egress port congestion. Larger buffers can result in more traffic being queued. The buffer is typically used if the traffic needs to be queued or if the buffer is not available, the traffic may be dropped. The efficiency of queuing algorithm can be a key switch attribute. With queuing latency ranging from tens to thousands of microseconds, depending on the traffic patterns, it can completely dwarf the nominal latency.

To improve switch performance, access-layer switches at trading environments have been implemented using a port-ASIC/crossbar switch architecture, rather than a switch-on-chip architecture. The port-ASIC/crossbar architecture allows switch designers to build adequate buffering in multiple chips to handle short-lived network congestion. Although switch-on-chip implementations can lead to more cost-effective switches, switch-on-chip implementations are constrained by squeezing lot of functionality into one chip, which generally means a significant compromise in the amount of buffering for the switch. This compromise leads to packet drops during even mild periods of congestion. However, although packet drops may be reduced in port-ASIC/crossbar architecture, latency may be increased due to traffic having to traverse multiple chips.

Another source of latency may be timing mismatches during packet transmissions. Traditionally, every Ethernet transmitter runs at a rate that is determined by its local and individual timing source (e.g., a crystal oscillator running with ±100 ppm accuracy). The receiving node slaves its timing to the transmitting source using the isochronous timing information that is embedded in the Ethernet data stream. However, timing mismatches between the various asynchronous nodes can accumulate and result in bit errors and dropped packets. The timing mismatch can also lead to accumulation of packets at egress ports (e.g., where egress ports have a different timing compared to the designated source port), leading to increased latency.

Ethernet devices typically allow a minimum idle period between transmission of Ethernet frames known as the inter packet gap (IPG). Lowering IPG can lead to lower latency, but reducing IPG can have other problems. A brief recovery time between packets allows devices to prepare for reception of the next packet. The minimum IPG is usually 96 bit times (i.e., the time it takes to transmit 96 bits of raw data on the medium), which is 9.6 µs for 10 Mbit/s Ethernet, 0.96 µs for 100 Mbit/s Ethernet, 0.096 µs for 1 Gbit/s Ethernet, and 0.0096 µs for 10 Gbit/s Ethernet. A smaller IPG can lead to packet collisions, which may be undesirable in some scenarios.

Communication system 10 is configured to address these issues (and others) in offering a system and method for low latency multicast in a network environment. Embodiments of communication system 10 may send a packet from a designated source port in switch 20 to a plurality of egress ports in switch 20 over an overlay network within switch 20. As used herein, the term "overlay network" is inclusive of dedicated paths (e.g., fixed paths) from ingress ports to egress ports that are built over (and in addition to) existing routing paths from the ingress ports to the egress ports.

The overlay network can be separate from normal switch routing and forwarding functions. The overlay network may provide an alternate routing with lower latency compared to a routing by forwarding engine 24 of switch 20. As used herein, the term "routing" can encompass a process of selecting paths along which to send network traffic. The overlay network may bypass forwarding engine 24, for example, ignoring and bypassing multicast protocol routing algorithms, instead using separate routing tables for connecting egress ports to ingress ports in switch 20. The overlay network can provide low latency and low jitter.

Although the overlay network may behave in certain scenarios similar to Switched Port Analyzer (SPAN) and Encapsulated Remote Switched Port Analyzer (ERSPAN), the implementation can be over dedicated paths for achieving low latency. In various embodiments, the overlay network can include one or more dedicated paths from the designated source port to the plurality of egress ports. Overlay module 22 may determine the dedicated paths from a mapping between the designated source port and the plurality of egress ports. In various embodiments, the mapping may be implemented through one or more subscription policies between the designated source port and the plurality of egress ports. For example, a subscription policy may include port numbers of the egress ports subscribing to the designated source port, limitations on the type of subscribed traffic, limitations on time periods during which the subscription is valid, and other suitable limitations based on particular network configurations or other considerations. In many embodiments, the plurality of egress ports may send a SUBSCRIBE message to overlay module 22 (or to the designated source port) to be included in the subscription.

In various embodiments, overlay module 22 may determine the mapping programmatically. In some embodiments, the mapping may be provided in a routing table. As used herein, a "routing table" can include a data structure or set of one or more rules stored in switch 20. The routing table may be stored in any suitable format, based on particular needs. For example, the routing table may be stored in a table format, with rows and columns. In another example, the routing table may be stored as a database program in switch 20.

In various embodiments, overlay module 22 may forward packets at the designated source port based on policy based routing. Policy based routing may include storing information from the subscription policy (or the subscription policy itself) in the routing table. For example, an incoming packet may be inspected, and if a policy match is found, the packet may be sent to the subscribed egress ports according to the subscription policy in the routing table.

Whereas normal routing by forwarding engine 24 may generate latency, for example, from packet lookup and processing of applicable routing algorithms, routing over the overlay network can be low latency, for example, by sending packets over the dedicated paths between the ingress ports and egress ports, without processing any complex routing algorithms. By way of an example, any packet received at a specific designated source port may be substantially always sent over the overlay network to the same set of egress ports that are mapped directly to it in the routing table. Exceptions may be implemented using appropriate filtering mechanisms. On the other hand, unlike overlay module 22, forwarding engine 24 may send each packet arriving at the same ingress port to different egress ports (or sets of egress ports) based upon complex routing algorithms.

Packets from the designated source port may continue to enter switch 20 and be processed and forwarded normally. Example normal processing functions of forwarding engine 24 can include Layer 2 and/or Layer 3 functions, including bridging, routing (e.g., to a destination port according to multicast protocols), redirection, traffic policing and shaping, access control, and queuing/buffering. In various embodiments, to avoid packet duplication, switch 20 may nominally disallow the same packet to be both forwarded to the destination port and broadcasted through the overlay network to the same destination port. For example, the packet sent by forwarding engine 24 may be preferentially dropped over the same packet sent over the overlay network.

Frames through the dedicated paths can be filtered at the designated source port and egress ports through various mechanisms such as light weight lookups including multiple mask-and match on Media Access Control Device Address (MAC DA), preamble, and through more complicated filters by looking deeper into the packet for control traffic, and/or application traffic. Filtering on multicast groups can potentially significantly reduce processing load on algorithmic trading engines. For example, mask-and-match can match lower 24 bits of a MAC DA. In a general sense, "filtering" can include passing or blocking packets at a network interface (e.g., ingress port or egress port) based on a variety of filter criteria (e.g., source address, content, etc.) of programmable depth in bytes which can change with packet type.

Frames through the dedicated paths that have passed through the filters can be optionally modified. In some embodiments, the modifications may include rewriting the packet header. Modifications can include one or more of (1) IP Time-To-Live (TTL) field decrement, IP checksum update, Ethernet Cyclic Redundancy Check (CRC) update as part of Layer 3 Routing, (2) IP Source Address, IP Destination Address, TCP/UDP/SCTP Source Ports or Destination Ports and Ethernet CRC update as part of Network Address Translation, (3) priority re-classifications or markings on IP Type of Service (TOS) or Layer 2 User Priority fields, and (4) 802.1Q VLAN mapping.

Moreover, traffic from the destination ports can bridge/ route to the designated source port and/or to other ports using regular switching features of switch 20. The destination ports may also be designated source ports. Normal traffic can be either disabled or enabled for egress ports subscribing to the ingress multicast stream with appropriate buffering enabled for overlay and normal paths (e.g., with optional priority on overlay fast paths). In one example embodiment, normal forwarding paths to the interested egress ports may be programmatically disabled.

In various embodiments, switch 20 can support multiple designated sources (ingress ports) and have multiple destinations (egress ports) subscribed to each particular designated source. To lower latency, embodiments of communication system 10 can support synchronous Ethernet as another alternative to eliminate elasticity needs. Synchronous networks typically establish a timing master and enslave various sub networks and nodes to the master. According to various embodiments, a source clock may be selectable among a group of designated source ports. Alternatively, a specific network element can be hand picked for a faster reference clock.

At least one of the plurality of egress ports can reduce an inter-data gap or the IPG ("Inter-Data/Inter-Packet Gap"), such that latency is lowered (e.g., transmitting packets with minimum IPG). Alternatively, the egress ports can perform elasticity buffering to achieve a similar effect (e.g., low latency). In some embodiment, the egress ports can implement elastic buffers and corresponding Inter-Data/Inter-Packet Gap adjustments. Elasticity buffering guides an egress port's inter-data gap (or IPG for packet data) to generally permit data to be clocked out of the egress ports on the egress ports' clocks at the source port transfer rates, eliminating any need for large burst absorption buffering to compensate for timing discrepancies between source and destination ports. Elasticity buffering generally does not significantly affect average IPG values, and can be a suitable alternative to decreasing IPG, yet achieving low latency.

In various embodiments, normal port and link functions, and ingress and egress port statistics may be preserved, such that the ports appear to be normal functioning ports. On-chip routing from an eligible source port can leverage existing path resources to rebuild the overlay path a star topology to sets of egress ports. In the case of exchanges desiring absolute fairness, any asymmetry can be rebalanced through programmable delay stages to potentially achieve fixed latency across multiple egress ports.

According to various embodiments, the designated source port can be a fully functional network port with egress traffic (e.g., data traffic as well as any link level or control plane frames). The multicast overlay network may effectively behave similarly to a shared media hub. Point-to-point communication can control (e.g., Data Center Bridging eXchange (DCBX), Link Layer Discovery Protocol (LLDP), Cisco Discovery Protocol (CDP)) so that multiple egress ports receiving the same packet over the overlay network can individually and selectively process or filter the packet. These protocols can be suitably modified to selectively mark packets (through fields and/or additional headers) such that only one egress port is elected to advertise capabilities.

Protocol Independent Multicast (PIM) protocols may also work on switch 20 with additional network traffic. Mixed mode, including regular multicast through forwarding engine 24 and simultaneous transmission over the overlay network, can also be possible where normal routing and forwarding occurs. In various embodiments, communication system 10 can achieve low latency for multicast/broadcast/replicator applications, complete fairness with approximately zero jitter, guaranteed delivery, full switch/router capabilities and flexible network and/or application processing and filtering offload.

Turning to the infrastructure of communication system 10, the network topology can include any number of servers, virtual machines, switches (including distributed virtual switches), routers, and other nodes inter-connected to form a large and complex network. A "node" may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment, including network 16, may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x ), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Network 16 may represent any type of networks, including Internet, enterprise networks, cloud networks, etc.

In various embodiments, switch 20 may include switches, routers, and other network elements that can interconnect one or more nodes within a network (e.g., network 16). In general, switch 20 includes appropriate hardware and software to enable it to inspect packet 18, determining the source and destination device of packet 18, and forward it appropriately. The term "switch" and "router" may be interchangeably used in this Specification to refer to any device that can receive, process, and forward packets in a network. In some embodiments, switch 20 may forward pockets according to certain specific protocols (e.g., TCP/IP, UDP, etc.).

In various embodiments, overlay module 22 may be a hardware element (e.g., a portion of an Application Specific Integrated Switch (ASIC)) inside switch 20. In other embodiments, overlay module 22 may be an application (e.g., computer program) running on a suitable network element, such as a server, a line card of switch 20, or other network element. In some embodiments, overlay module 22 may be implemented on a physical line and/or switch card; in other embodiments, overlay module 22 may be implemented on a virtual line card. In yet other embodiments, overlay module 22 may be implemented on an ASIC within switch 20. In still further embodiments, overlay module 22 may be implemented on the same ASIC as the forwarding engine of switch 20.

In various embodiments, provider 12 may include one or more networks, such as data centers, and enterprises. In some embodiments, provider 12 may be a single device; in other embodiments, provider 12 may be one or more devices. In some embodiments, provider 12 may represent one or more applications running on one or more servers. A plurality of providers may connect to switch 20 within the broad scope of the embodiments.

In various embodiments, consumers 14 may include single devices, networks, enterprises, and organizations. Packet 18 may be routed to one or more devices at each of consumers 14. For example, consumer 14(1) may include a brokerage firm with several servers, routers, and computing devices, in addition to various end user applications that may consumer packet 18. Any number of consumers 14 may connect to switch 20 within the broad scope of the embodiments. In addition, any number of switches may be included within network 16 without departing from the scope of the embodiments.

Figure 2:
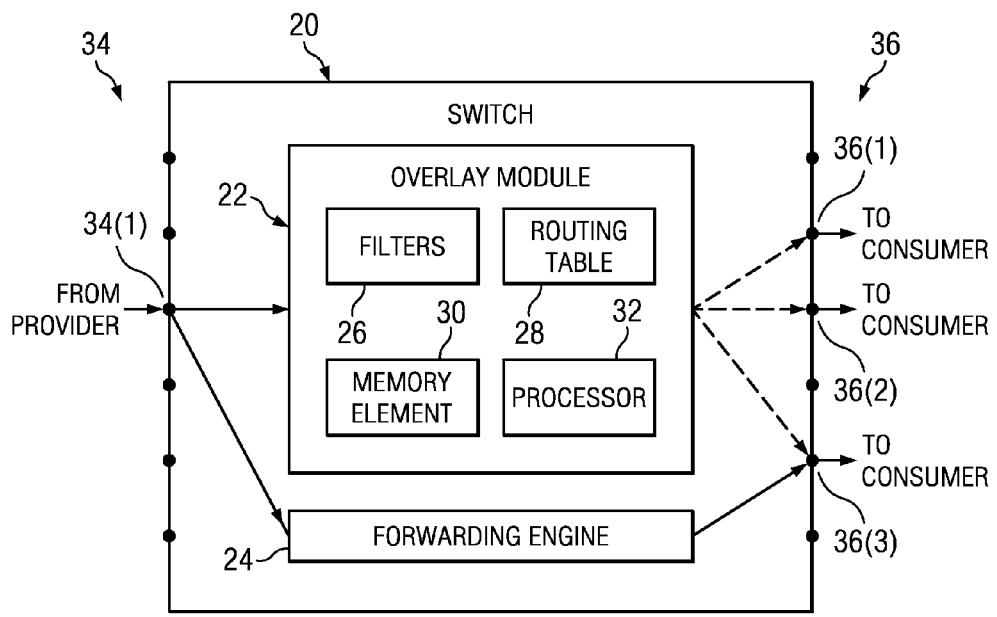
FIG. 2 is a simplified block diagram illustrating example details of an embodiment of the communication system.

Turning to FIG. 2, FIG. 2 is a simplified block diagram illustrating example details of communication system 10 according to an example embodiment. Switch 20 may include overlay module 22 and a forwarding engine 24. Overlay module 22 may include one or more filters 26, a routing table 28, a memory element 30, and a processor 32. Switch 20 may include one or more ingress ports 34 and one or more egress ports 36.

An example ingress port 34(1) may be a designated source port according to an embodiment of communication system 10. A packet from provider 12 arriving at ingress port 34(1) may be routed by overlay module 22 to egress ports 36(1)-36(3), and by forwarding engine 24 to egress port 36(3). Overlay module 22 may use processor 32 and memory element 30 to perform the various operations, as described herein.

According to various embodiments, a network administrator may designate ingress port 34(1) as the designated source port. Switch 20 may include other designated source ports also. Merely for ease of illustration, a single representative ingress port 34(1) is described herein. For example, ingress port 34(1) may be connected to provider 12, and may continuously receive data therefrom. In an example embodiment, provider 12 may be a server in a market exchange. The server may provide continuous market feed data to switch 20 over ingress port 34(1). Egress ports 36(1)-36(3) may be configured to be interested in ingress port 36(1). For example, egress ports 36(1)-36(3) may be dedicated to send data to consumers 14(1)-14(3), respectively. The network administrator may configure routing table 28 such that ingress source port 34(1) is mapped to egress ports 36(1)-36(3). In other embodiments, egress ports 36(1)-36(3) may send a SUBSCRIBE message to overlay module 22 (or ingress port 34(1)) as part of a subscription policy.

Merely as an example illustration of a financial trade environment, and not as a limitation, assume that consumers 14(1)-14(3) may be interested in receiving information from a specific market exchange (corresponding to a specific IP address). Furthermore, assume that consumer 14(1) is interested in receiving small-cap market information from the market exchange; consumer 14(2) is interested in both small-cap and large-cap market information; and consumer 14(3) is interested in receiving large-cap market information.

Filters 26 may include filters at ingress port 34(1) and egress ports 36(1)-36(3). In one embodiment, data entering at ingress port 34(1) can include data from a variety of source, including the market exchange, small-cap information, large-cap information, and other types of information. Filters 26 at ingress port 34(1) can filter data from all sources except the specific market exchange identified by the source IP address in the received packets. Further filters 26 at ingress port 34(1) can filter according to packet content, filtering certain type of information (e.g., information other than small-cap and large-cap market information) at ingress port 34(1). The filtered data can be sent directly to interested egress ports 36(1)-36(3) over dedicated paths from ingress port 34(1).

Filters 26 at egress ports 36(1) and 36(3) can further filter the data as desired. In various embodiments, the data packets may be independently filtered at one or more egress ports 36(1)-36(3). For example, filters 26 at egress port 36(1) may filter out large-cap market information, and send out only small-cap market information through egress port 36(1). Filters 26 at egress port 36(3) may filter out small-cap market information, and send out only large-cap market information through egress port 36(3). Data reaching egress ports 36(1)-36(3) may bypass normal multicast routing by forwarding engine 24. Such bypassing of normal routing can reduce latency.

Additionally, the data arriving at ingress port 34(1) may be sent through forwarding engine 24. According to multicast routing protocols, assume that forwarding engine 24 determines that egress port 36(3) should receive the data. When the data arrives at egress port 36(3), it may be a duplicate of the data already received at egress port 36(3) over the overlay network. The data received processed by forwarding engine 24 may be dropped preferentially over the same data received over the overlay network, to avoid duplication. Although ingress ports 34 and egress ports 36 are distinctly shown in the FIGURE, it may be noted that an ingress port for some traffic can be an egress port for other traffic. Moreover, any number of ingress and egress ports may be provided in switch 20 within the broad scope of the embodiments.

Turning to FIG. 3, FIG. 3 is a simplified diagram illustrating a portion of an example routing table. Example routing table 28 may include at least two fields: designated source port field 40 and interested egress ports field 42. Designated source port field 40 may include a list of designated source ingress ports 34 in switch 20. Interested egress ports field 42 may include a list of egress ports 36 that are interested in traffic from corresponding designated source ports. For example, egress port numbers 11, 12, 13 and 22 may be interested in traffic from designated source port number 1; egress port numbers 14, 16, 20, and 21 may be interested in traffic from designated source port number 2; and egress port numbers 15, 17, 18 and 19 may be interested in traffic from designated source port number 3. Traffic received at designated source port number 1 may be routed directly to egress port numbers 11, 12, 13 and 22 according to routing table 28. No packet inspection may be necessary, thereby reducing latency.

The numerals identifying port numbers shown herein are merely for the sake of illustration. Switch 20 may use any descriptor to identify ingress ports 34 and egress ports 36, including characters, numerals, and a combination thereof. Moreover, the example format of routing table 28 shown in the FIGURE is merely an illustration, and it is not a limitation. Routing table 28 may be stored in switch 20 in any suitable format, according to particular needs.

Turning to FIG. 4, FIG. 4 is a simplified block diagram illustrating example details of an embodiment of communication system 10. Switch 20 may include forwarding engine 24 and overlay module 22. Filters 26 in overlay module 22 may include ingress filters 44 and egress filters 46. Forwarding engine 22 may include buffering, queuing and scheduling module 48 and forwarding module 50. A packet entering ingress ports 34 may be filtered at ingress filters 44. Ingress filters 44 may filter horizontally (e.g., overlay path), but may not filter vertically (e.g., normal path to forwarding engine 24). In some embodiments, ingress filters 44 may be mask and match as in a Ternary Content Addressable Memory (TCAM) with a corresponding admit/deny result. When all packets are admitted, ingress filters 44 may be effectively disabled.

A packet entering switch 20 from ingress port 34(1) may be filtered at ingress filter 44. The packet may be duplicated and routed by overlay module 22 to egress ports 36(1)-36(4). Egress filters 46 may further filter the packets and send them out through appropriate egress ports (e.g., 36(2) and 36(3)). The packet may not be filtered vertically, and may proceed to forwarding engine 24. Forwarding engine 24 may subsequently send the packet to egress ports 36(1)-36(4). Duplicate packets received at egress ports 36(2) and 36(3) from forwarding engine 24 may be preferentially dropped over the packets received over the overlay network. It may be noted that the same port can act as both ingress port and egress port. For ease of illustration, a single port (e.g., port 1) is designated as ingress port 34(1) and egress port 36(1) to indicate such simultaneous functionalities.

Figure 5:
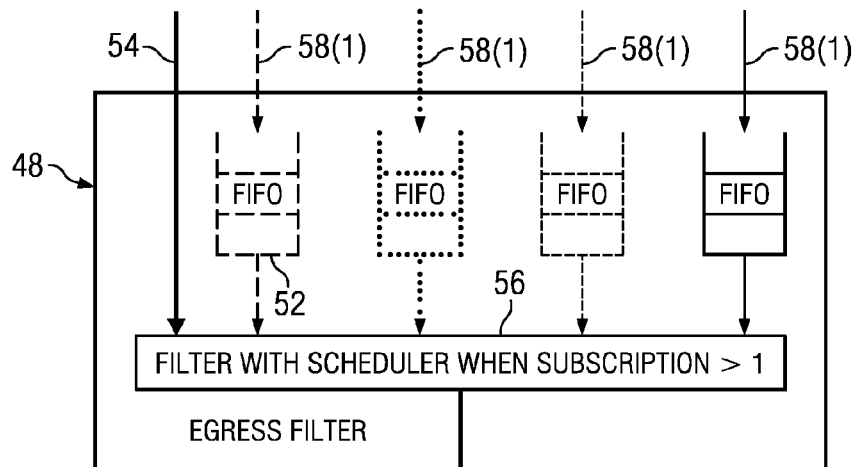
FIG. 5 is a simplified block diagram illustrating further example details of an embodiment of the communication system.

Turning to FIG. 5, FIG. 5 is a simplified block diagram illustrating example details of an embodiment of communication system 10. Filter 48 may include First In First Out (FIFO) buffers 52. Filtering may be based on each egress port's subscription to the designated source port and programmable mask and match off contents of the preamble and packet, up to programmable depth in bytes in some embodiments.

Each of egress ports 36 can be configured for normal operation to select all normal traffic 54 from forwarding engine 24. Each of egress ports 36 can also be configured to subscribe to specific designated ports for which FIFO buffering can be kept at a minimum threshold level by filter 56. Such configuration may be used for TCAM match decision, for example. Filter 56 may filter packets with the switch's scheduler when subscription is greater than one designated source port. In some embodiments, each of egress ports 36 can be configured to subscribe to both a specific designated port and normal traffic, with strict priority for the specific designated port. In some embodiments, each of egress ports 36 can be configured to subscribe to any number of designated sources (e.g., represented by traffic 58(1)-58(4)). The subscription may be with strict priority and Deficit Weighted Round Robin (DWRR) implemented after the filter and packet drop when FIFOs 52 fill up.

Figure 6:
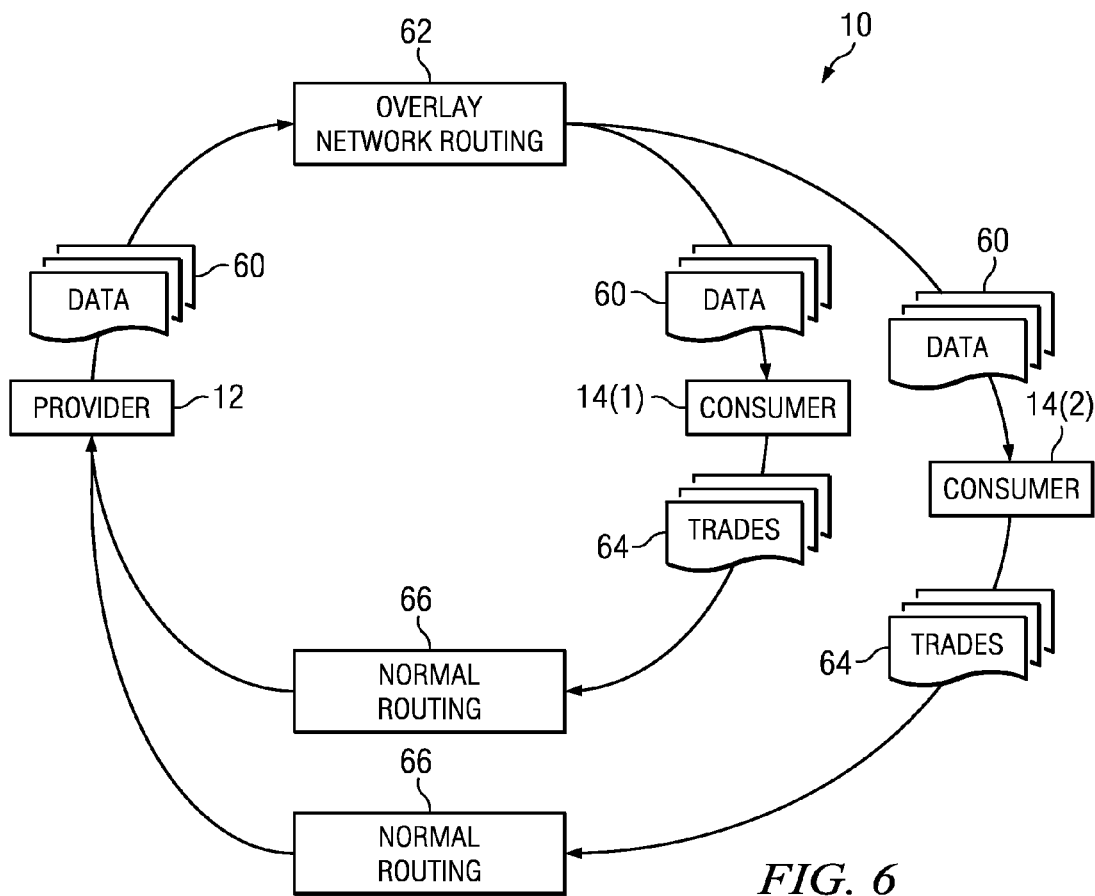
FIG. 6 is a simplified diagram illustrating an example network traffic flow that may be associated with an example embodiment of the communication system.

Turning to FIG. 6, FIG. 6 is a simplified block diagram illustrating an example network traffic flow according to embodiments of communication system 10. Data 60 from provider 12 may be routed to consumers 14(1) and 14(2) over overlay network routing 62. For example, provider 12 may be a market exchange. Market data may be received in a ticker plant of provider 12. The data stream may be normalized, formatted, processed and republished as data 60.

In various embodiments, overlay network routing 62 may be part of the hardware of switch 20. Data 60 may be routed with low latency and low jitter over overlay network 62. Consumers 14(1) and 14(2) may receive data 60. Trading applications at consumers 14(1)-14(2) may receive data 60. Data 60 may be processed by pricing engines, algorithmic trading engines and humans. Orders may be triggered either programmatically by automated trading engines, or by human traders. The orders may be appropriately formatted into trades 64. Each consumer 14(1) and 14(2) may initiate bi-directional communication with provider 12 to ensure security of the transaction. Thus, trades 64 may be sent to provider 12 over normal routing 66, using TCP/IP or similar protocols.

In some embodiments, overlay network routing 62 and normal routing 66 may be implemented in the same switch 20. In other embodiments, overlay network routing 62 and normal routing 66 may be implemented in separate switches (and/or hardware). For ease of illustration, merely one routing block is indicated for each stream of traffic. However, any number of routing blocks via numerous switches may be used within the broad scope of the present disclosure.

For example, a typical trading environment may involve a stock exchange data center, which may act as provider 12 to a service distribution network, which may be consumers 14 of the market feeds from the stock exchange data center. In turn, the service distribution network may act as provider 12 to a financial service provider, which may be consumers 14 of the feeds distributed by the service distribution network. The financial service providers may send the feeds to brokerage data centers, acting as provider 12 to the brokerage data center consumers.

Within the brokerage data centers, several feed engines, and other end user applications may consume the received data, acting as consumers 14. Each entity (stock exchange data center, service distribution network, financial service provider and brokerage data centers) may include one or more switches, servers, and other network elements. Overlay network routing 62 may be implemented in some or all of such switches to enable low latency, low jitter communication of market feeds to the appropriate consumers.

Figure 7:
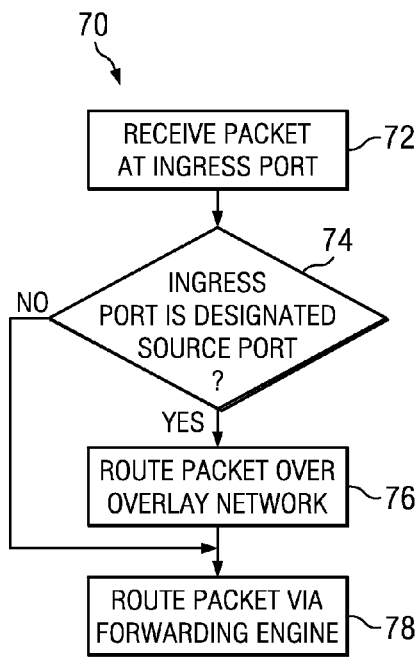
FIG. 7 is a simplified flow diagram illustrating example operations that may be associated with an embodiment of the communication system.

Turning to FIG. 7, FIG. 7 is a simplified flow diagram illustrating example operations that may be associated with ingress ports 34. Operations 70 may include 72, at which packet 18 is received at ingress port 34(1). At 74, a determination may be made whether ingress port 34(1) is a designated source port. For example, routing table 28 may be looked up to determine if ingress port 34(1) is included therein. If it is not included, ingress port 34(1) may not be a designated source port. Otherwise, it may be a designated source port. If ingress port 34(1) is a designated source port, at 76, packet 18 may be routed over the overlay network. Additionally, packet 18 may also be routed via forwarding engine 24. If ingress port 34(1) is not a designated source port, at 78, packet 18 may be routed via forwarding engine 24.

Figure 8:
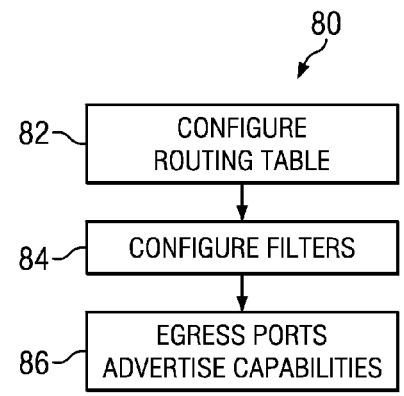
FIG. 8 is a simplified flow diagram illustrating other example operations that may be associated with an embodiment of the communication system.

Turning to FIG. 8, FIG. 8 is a simplified flow diagram illustrating example operations 80 that may be associated with embodiments of communication system 10. Operations 80 may include 82, at which routing table 28 may be configured. In one embodiment, a network administrator may manually create routing table 28, for example, assigning ingress ports 34 as designated source ports and assigning egress ports 36 to appropriate designated source ports. In another embodiment, egress ports 36 (e.g., egress ports 36(1)-36(3)) may indicate their interest in joining a specific designated source port (e.g., ingress port 34(1)), and routing table 28 may be automatically created by appropriate management software. Various mechanisms for configuring routing table 28 may be used within the broad scope of the embodiments.

At 84, filters 26 may be configured. In some embodiments, ingress filters 44 may be configured separately from egress filters 48. The filters may be configured for light weight lookups and other appropriate mask-and-match filtering procedures. FIFOs 52 in egress filters 48 may be also configured appropriately. At 86, egress ports 36 may advertise capabilities (e.g., ability to receive certain packet formats, information about the port, speed, buffering capacity, etc.).

Figure 9:
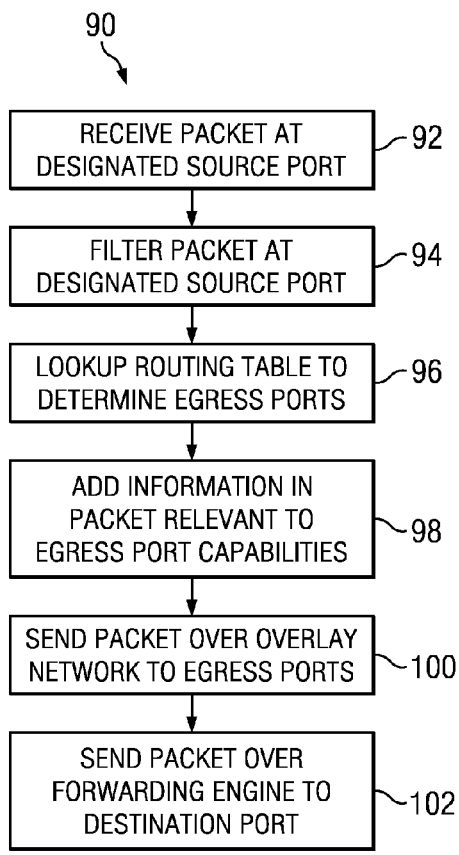
FIG. 9 is a simplified flow diagram illustrating yet other example operations that may be associated with an embodiment of the communication system.

Turning to FIG. 9, FIG. 9 is a simplified flow diagram illustrating example operations that may be associated with embodiments of communication system 10. Operations 90 may include 92, at which packet 18 is received at a designated source port (e.g., ingress port 34(1)). At 94, packet 18 may be filtered at ingress port 34(1). At 96, routing table 28 may be looked up to determine appropriate egress ports 36(1)-36(3), to which to send packet 18. In some embodiments, at 98, information may be added to packet 18 that is relevant to egress port capabilities.

For example, a header of packet 18 may be rewritten to support capabilities of an interested egress port (e.g., egress port 36(1)). In some scenarios, all interested egress ports 36(1)-36(3) may not have identical capabilities. In such scenarios, the rewritten header may be relevant only to some of egress ports 36 (e.g., egress port 36(1)) and not to the others (e.g., egress ports 36(2), 36(3)). In other embodiments, the header may be rewritten to accommodate multiple, varied capabilities of separate egress ports 36(1)-36(3). At 100, packet 18 may be sent over the overlay network to interested egress ports 36(1)-36(3). At 102, packet 18 may be sent to forwarding engine 24, for normal routing according to applicable multicast (or unicast, or broadcast) protocols.

Figure 10:
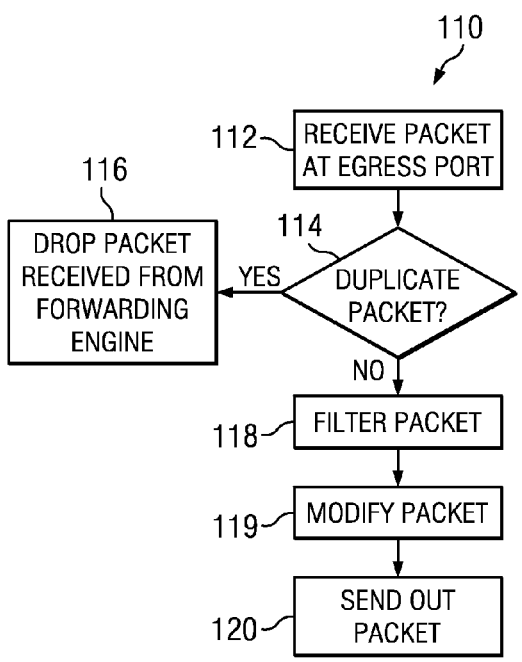
FIG. 10 is a simplified flow diagram illustrating yet other example operations that may be associated with an embodiment of the communication system.

Turning to FIG. 10, FIG. 10 is a simplified flow diagram illustrating example operations that may be associated with a representative egress port 36(1) in communication system 10. Operations 110 may include 112, at which packet 18 is received at egress port 36(1). At 114, a determination may be made whether packet 18 is a duplicate packet that has already been received at egress port 36(1). If packet 18 is a duplicate packet (e.g., it was routed over the overlay network and by forwarding engine 24), packet 18 received from forwarding engine 24 may be dropped at egress port 36(1). If packet 18 is not a duplicate packet, at 118, packet 18 may be filtered appropriately by egress filters 48. At 119, packet 18 may be modified appropriately. Modifications can include Layer 3 Routing, including IP TTL field decrement, IP checksum update, Ethernet CRC update; network address translation, including updating IP Source Address, IP Destination Address, TCP/UDP/SCTP Source Ports or Destination Ports and Ethernet CRC; priority re-classifications or markings on IP TOS or Layer 2 User Priority fields; and 802.1Q VLAN mapping. At 120, packet 18 may be sent out through egress port 36(1).

Note that the numerical and letter designations assigned to the elements of the preceding FIGURES do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in the FIGURES is simplified for ease of illustration. Moreover, communication system 10 can include any number of illustrated elements within the broad scope of the present disclosure.

Note that although the embodiments have been described herein with reference to financial trading environments, communication system 10 and the methods described herein are applicable in any suitable network environment. For example, embodiments of communication system 10 may be used in video communication (e.g., streaming movies) where low latency is particularly desirable, as it can lead to enhanced consumer experience.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in switch 20 (e.g., provisioned as part of overlay module 22, forwarding engine 24, etc.). In some embodiments, one or more of these features may be implemented in hardware, provided external to these elements, or consolidated in any appropriate manner to achieve the intended functionality. The various network elements (e.g., provider 12, switch 20, consumers 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the network elements of FIG. 1 (e.g., switch 20) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 30) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 32) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a packet at a designated source port of a switch; and
   sending the packet from the designated source port to a plurality of mapped egress ports in the switch over an overlay network that bypasses a forwarding engine of the switch and provides an alternate routing path having a lower latency characteristic compared to a standard routing path provided by the forwarding engine of the switch.

2. The method of claim 1, wherein the overlay network includes one or more dedicated paths from the designated source port to the plurality of egress ports, and wherein the one or more dedicated paths is determined from a mapping between the designated source port and the plurality of egress ports.

3. The method of claim 2, wherein the mapping is provided in a routing table.

4. The method of claim 1, wherein the designated source port is one of a plurality of eligible source ports, and wherein the plurality of egress ports subscribe to the designated source port according to at least one subscription policy.

5. The method of claim 1, wherein the forwarding engine performs a selected one of a group of Layer 2 and Layer 3 functions, the group consisting of:
   a) a bridging function;
   b) a routing function;
   c) a redirecting function;
   d) a traffic policing and shaping function;
   e) an access control function;
   f) a queuing/buffering function; and
   g) a network address translation function.

6. The method of claim 1, wherein a duplicate packet processed by the forwarding engine and received at an egress port is preferentially dropped over another packet received at the egress port over the overlay network.

7. The method of claim 1, wherein the packet is filtered at the designated source port or at least one of the plurality of egress ports.

8. The method of claim 7, further comprising:
modifying the packet after it is filtered.

9. The method of claim 1, wherein at least one of the plurality of egress ports can reduce an Inter-Data/Inter-Packet Gap, and another one of the plurality of egress ports can implement elastic buffers.

10. The method of claim 1, wherein at least one of the plurality of egress ports is elected to advertise capabilities to the designated source port.

11. Logic encoded in non-transitory media that includes instructions for execution and when executed by a processor, is operable to perform operations comprising:
receiving a packet at a designated source port of a switch; and
sending the packet from the designated source port to a plurality of mapped egress ports in the switch over an overlay network that bypasses a forwarding engine of the switch and provides an alternate routing path having a lower latency characteristic compared to a standard routing path provided by the forwarding engine of the switch.

12. The logic of claim 11, wherein the overlay network includes one or more dedicated paths from the designated source port to the plurality of egress ports, and wherein the one or more dedicated paths is determined from a mapping between the designated source port and the plurality of egress ports.

13. The logic of claim 12, wherein the mapping is provided in a routing table.

14. The logic of claim 11, wherein the designated source port is one of a plurality of eligible source ports, and wherein the plurality of egress ports subscribe to the designated source port according to at least one subscription policy.

15. The logic of claim 11, wherein a duplicate packet processed by the forwarding engine and received at an egress port is preferentially dropped over another packet received at the egress port over the overlay network.

16. The logic of claim 11, wherein the packet is filtered at the designated source port or at least one of the plurality of egress ports.

17. An apparatus, comprising:
a memory element for storing data;
a processor that executes instructions associated with the data; and
an overlay module configured to interface with the processor and the memory element such that the apparatus is configured to:
receive a packet at a designated source port of the apparatus; and
send the packet from the designated source port to a plurality of mapped egress ports over an overlay network that bypasses a forwarding engine of the switch and provides an alternate routing path having a lower latency characteristic compared to a standard routing path provided by the forwarding engine of the apparatus.

18. The apparatus of claim 17, wherein the overlay network includes one or more dedicated paths from the designated source port to the plurality of egress ports, and wherein the one or more dedicated paths is determined from a mapping between the designated source port and the plurality of egress ports.

19. The apparatus of claim 17, wherein the designated source port is one of a plurality of eligible source ports, and wherein the plurality of egress ports subscribe to the designated source port according to at least one subscription policy.

20. The apparatus of claim 17, wherein a duplicate packet processed by the forwarding engine and received at an egress port is preferentially dropped over another packet received at the egress port over the overlay network.

* * * * *